United States Patent
Triebel et al.

(10) Patent No.: US 10,308,092 B2
(45) Date of Patent: Jun. 4, 2019

(54) ROLL STABILIZATION SYSTEM FOR A MOTOR VEHICLE

(71) Applicant: ZF Friedrichshafen AG, Friedrichshafen (DE)

(72) Inventors: Michael Triebel, Oberschwarzach (DE); Achim Thomae, Bergrheinfeld (DE); Helmut Baalmann, Bergrheinfeld (DE); Stefan Rappelt, Sulzheim (DE); Ernst Oswald, Gerolzhofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 39 days.

(21) Appl. No.: 15/524,358

(22) PCT Filed: Nov. 10, 2015

(86) PCT No.: PCT/EP2015/076123
§ 371 (c)(1),
(2) Date: May 4, 2017

(87) PCT Pub. No.: WO2016/091509
PCT Pub. Date: Jun. 16, 2016

(65) Prior Publication Data
US 2018/0229577 A1    Aug. 16, 2018

(30) Foreign Application Priority Data

Dec. 9, 2014    (DE) .................. 10 2014 225 288

(51) Int. Cl.
*H02J 7/00*    (2006.01)
*B60G 21/055*    (2006.01)
*B60R 16/033*    (2006.01)

(52) U.S. Cl.
CPC ........ *B60G 21/0555* (2013.01); *B60R 16/033* (2013.01); *H02J 7/0065* (2013.01);
(Continued)

(58) Field of Classification Search
USPC ....................................................... 320/135
See application file for complete search history.

(56) References Cited

U.S. PATENT DOCUMENTS

2007/0182110 A1    8/2007    Urababa
2008/0246257 A1    10/2008    Krimmel
(Continued)

FOREIGN PATENT DOCUMENTS

DE    10 2005 031 514 A1    1/2007
DE    10 2006 016 186 A1    10/2007
(Continued)

OTHER PUBLICATIONS

German Search Report Corresponding to 10 2014 225 288.1 dated Aug. 14, 2015.
(Continued)

*Primary Examiner* — Bryce M Aisaka
(74) *Attorney, Agent, or Firm* — Davis & Bujold PLLC; Michael J. Bujold

(57) ABSTRACT

A roll stabilization system (1) for a motor vehicle which has a DC voltage converter (6) associated with an electric roll stabilizer (2). By way of the DC voltage converter, a feed voltage can be transformed into a supply voltage for the roll stabilizer (2). To produce as compact a structure as possible, the DC voltage converter (6) is integrated in the electric roll stabilizer (2).

10 Claims, 1 Drawing Sheet

(52) U.S. Cl.
    CPC .... *B60G 2202/135* (2013.01); *B60G 2202/42* (2013.01); *B60G 2204/122* (2013.01); *B60G 2204/20* (2013.01)

(56) References Cited

U.S. PATENT DOCUMENTS

2009/0261796 A1* 10/2009 Ito ........................... B60R 16/03
                                                        323/285
2012/0313338 A1   12/2012 Kondo
2015/0151604 A1*  6/2015 Park ......................... F16H 1/28
                                                       280/124.106

FOREIGN PATENT DOCUMENTS

| DE | 10 2006 022 790 A1 | 11/2007 |
| DE | 10 2007 015 995 A1 | 10/2008 |
| DE | 10 2008 031 270 A1 | 1/2010 |
| DE | 10 2010 014 104 A1 | 10/2011 |
| DE | 10 2010 041 976 A1 | 4/2012 |
| DE | 10 2010 042 915 A1 | 4/2012 |
| JP | H11-329096 | 11/1999 |

OTHER PUBLICATIONS

International Search Report Corresponding to PCT/EP2015/076123 dated Feb. 4, 2016.
Written Opinion Corresponding to PCT/EP2015/076123 dated Feb. 4, 2016.

* cited by examiner

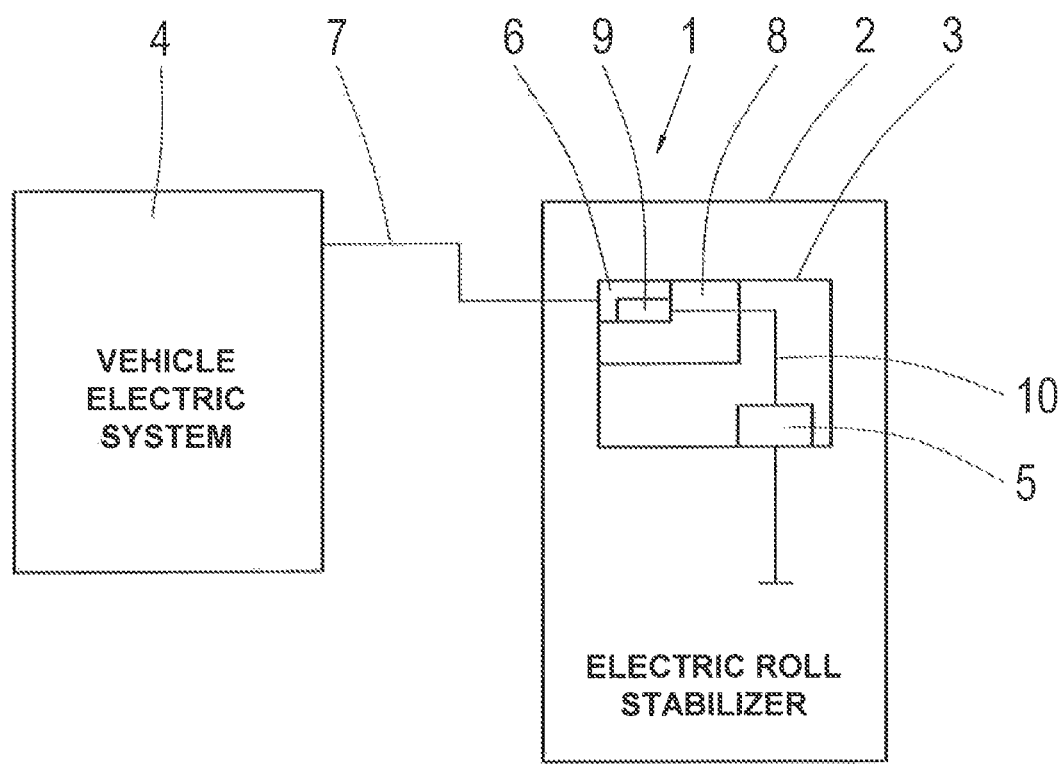

ROLL STABILIZATION SYSTEM FOR A MOTOR VEHICLE

This application is a National Stage completion of PCT/EP2015/076123 filed Nov. 10, 2015, which claims priority from German patent application serial no. 10 2014 225 288.1 filed Dec. 9, 2014.

FIELD OF THE INVENTION

The invention concerns a roll stabilization system for a motor vehicle, comprising an electric roll stabilizer associated with a DC voltage converter such that the DC voltage converter can convert a feed voltage into a supply voltage for the roll stabilizer. The invention also concerns a control device for the aforesaid roll stabilization system

BACKGROUND OF THE INVENTION

In motor vehicles roll stabilization systems serve to regulate rolling and to reduce the lateral inclination of the body when driving around a curve. Besides classical designs, also called passive systems that have a U-shaped stabilizer rod, active roll stabilization systems too are known. In these, two stabilizer rods separate from one another can be rotated relative to one another by means of a swivel motor positioned between them, in order to exert a defined restoring torque about the roll axis. This preserves an almost horizontal orientation of the vehicle body even when rounding a curve. However, the restoring torque has to be exerted by the swivel motor within an extremely narrow time window, and this presupposes a high power of the swivel motor. In the case of electromechanical swivel motors, when used in a conventional 12-volt electrical system of a motor vehicle this results in extremely large currents, so the leads to the swivel motor have to be appropriately sized to take such loads. For that reason roll stabilization systems are sometimes also operated in sub-networks with higher supply voltages.

DE 10 2006 016 186 A1 describes a roll stabilization system in which an electric roll stabilizer is incorporated in a sub-network of a motor vehicle, which is connected by way of an intermediate DC voltage converter to a vehicle electrical system that also comprises a generator. With the help of the DC voltage converter a feed voltage of the main network can then be transformed into a supply voltage suitable for the roll stabilizer.

SUMMARY OF THE INVENTION

Starting from the above-described prior art, the purpose of the present invention is to provide a roll stabilization system for a motor vehicle, wherein the system has a compact structure.

This objective is achieved with the claimed roll stabilization system in combination with the characterizing features thereof. Advantageous further developments of the invention as well as a control device for a stabilization system is also an object of the claims.

The invention relates to a roll stabilization system with an electric stabilizer with which is associated a DC voltage converter. By virtue of the DC voltage converter, a feed voltage can be transformed into a supply voltage for the roll stabilizer. Particularly preferably, the electric stabilizer consists of two stabilizer parts and an intermediate electromechanical swivel motor, by means of which, in order to produce a defined restoring torque, the two parts of the stabilizer can be rotated relative to one another. Associated with the electromechanical swivel motor there is a control device which regulates the current flowing in the parts and hence also coordinates the production of a restoring torque.

In the context of the invention the feed voltage is preferably the electric voltage in an electrical system of the motor vehicle concerned, with which the sub-network of the electric roll stabilizer is coupled by way of the intermediate DC voltage converter. On the other hand, the supply voltage of the roll stabilizer is the electric voltage at which the electric roll stabilizer is operated.

The invention makes use of the technical principle that the DC voltage converter is integrated into the roll stabilizer. In other words, the DC voltage converter is located inside the electric roll stabilizer.

Such a design of a roll stabilization system has the advantage that by integrating the DC voltage converter in the electric roll stabilizer, a compact assembly can be produced which can be fitted in the area of the relevant axle of the motor vehicle. The transformation of the feed voltage into the supply voltage also makes it possible if the voltage is correspondingly increased, to reduce electric currents in the electric roll stabilizer, whereby the leads can be made with smaller cross-sections so that a further saving of fitting space is possible. Thus, the DC voltage converter is used as a so-termed Step-Up converter with the help of which the feed voltage can be converted to a higher supply voltage, In contrast, in the case of DE 10 2006 016 186 A1 no indication is given about where the DC voltage converter is located between the two sub-networks. Accordingly, there is here also no proposal to integrate the same into the electric roll stabilizer and thereby to save fitting space.

In an embodiment of the invention the DC voltage converter is integrated in a control device of the electric roll stabilizer. In a further development of that embodiment, the control device is then in turn integrated in a swivel motor of the electric roll stabilizer. In both cases a further reduction of the necessary fitting space can be achieved.

Alternatively to the above-described design, however, the control device can be arranged externally on the swivel motor, and then as flat as possible a design of a housing of the control device is necessary in order to avoid contact thereof with obstacles in the road, resulting in damage. In that case an electronic circuit board is preferably arranged in the housing of the control device in such manner that components on the circuit board that require cooling are in direct contact with a lower housing shell, so that excess heat can be conducted away quickly. Cooling fins or sheet folds can also be provided on the housing in order further to improve the heat dissipation. For reasons of electromagnetic compatibility, an upper housing shell should consist for example of an aluminum sheet or even a metal-coated plastic, and should be joined to the lower housing shell with a seal between them. Finally, damping inserts should be provided between the body and the control device and inside the control device between the circuit board and the housing shells and on the leads, in order to avoid the transmission of vibrations from the control device into the vehicle.

A further design possibility is to run the cable leading from the control device to an electric swivel motor through a conduit whose outer layer is provided with metal spirals. Besides reducing the risk that the cable may break or be pulled free this also increases the security against theft, since unwinding the cable is then more difficult. Alternatively, however, or even in addition, the control device can be provided with a code and incorporated in a vehicle-specific theft alarm.

Preferably the DC voltage converter comprises a control unit by which the feed voltage can be determined and which initiates a conversion only when the feed voltage differs from the supply voltage. This has the advantage that the electric roll stabilizer in the form of an assembly can be used universally in different vehicles with vehicle electrical system voltages that are different from one another, wherein the DC voltage converter only carries out an appropriate conversion if the supply voltage differs from the feed voltage of the electric roll stabilizer.

According to a further embodiment the DC voltage converter is designed as a transforming converter or as a converter with a storage throttle. In both cases a suitable design of a DC voltage converter can be produced.

Preferably the supply voltage is 40 to 48 volts, so that depending on the vehicle electrical system voltage a transformation starting from 12 or 24 volts is carried out.

The aforesaid embodiments relating to the DC voltage converter can correspondingly also be realized when the converter is integrated in the control device of the roll stabilizer.

The invention is not limited to the indicated combination of characteristics specified in the principal claim or the dependent claims. There are also possibilities for combining individual features with one another provided that they emerge from the claims, the description given below of a preferred embodiment of the invention, or directly from the drawing. The references in the claims to the drawing by the use of indexes is not intended to limit the protective scope of the claims.

BRIEF DESCRIPTION OF THE DRAWINGS

The sole FIGURE shows a schematic representation of part of a motor vehicle comprising a roll stabilization system designed in accordance with a preferred embodiment of the invention.

DETAILED DESCRIPTION OF THE PREFERRED EMBODIMENTS

This roll stabilization system 1 comprises an electric roll stabilizer 2 which, in a manner whose principle is familiar to those with knowledge of the subject—and is therefore not explained in detail here—consists of stabilizer parts and an intermediate electromechanical swivel motor 3 between them.

The swivel motor 3 is supplied with electric current from inside the vehicle, by way of a vehicle electrical system 4 and a generator provided in it—not shown further—the vehicle electrical system 4 preferably being a 12-volt electrical system. However, since control tasks of the swivel motor 3 in the course of active roll stabilization have to be carried out in exceptionally short times and consequently the swivel motor 3 has to deliver high power outputs in order to produce the requisite restoring torques, with the feed voltage of 12 volts very large electric currents would have to be supplied to the swivel motor 3 to enable it to deliver such powers. For that reason a DC voltage converter 6 is connected upstream from electronic components 5 of the swivel motor 3, by means of which the feed voltage of 12 volts is transformed into a supply voltage, for example of 48 volts. The DC voltage converter 6 is connected to the vehicle electrical system 4 by a lead 7, and on its output side is connected to the components 5 of the swivel motor 3.

A special feature here is that the DC voltage converter 6 is integrated into a control device 8 of the roll stabilizer 2, which in turn is accommodated in the swivel motor 3. In addition, the DC voltage converter 6 is equipped with a control unit 9 which determines the feed voltage in the lead 7 and initiates a transformation only if the feed voltage differs from the desired supply voltage. In the present case, therefore, the voltage is transformed from 12 volts to 48 volts. However, if in the vehicle electrical system 4 a higher voltage is already present, in the best case even already 48 volts, then if necessary a transformation is completely dispensed with. In the present case the DC voltage converter 6 is also designed as a converter with a storage throttle.

Starting from the DC voltage converter 6, a current supply to the swivel motor 3 is then regulated with the help of the control device 8 so that the cables 10 leading to the components 5 can be made with a smaller diameter since the current is smaller. Moreover, for protection the cables 10 are run through a conduit—not shown here—whose outer layer is provided with metal spirals.

By virtue of the design of a roll stabilization system according to the invention, an electric roll stabilizer with a compact structure can be produced.

INDEXES

1 Roll stabilization system
2 Electric roll stabilizer
3 Swivel motor
4 Vehicle electrical system
5 Components
6 DC voltage converter
7 Lead
8 Control device
9 Control unit
10 Cables

The invention claimed is:

1. A roll stabilization system for a motor vehicle, the roll stabilization system comprising:
   an electric roll stabilizer;
   a DC voltage converter being associated with the electric roll stabilizer such that a feed voltage can be transformed by the DC voltage converter into a supply voltage for the roll stabilizer; and
   the DC voltage converter being integrated in the electric roll stabilizer.

2. The roll stabilization system according to claim 1, wherein the DC voltage converter is integrated in a control device of the electric roll stabilizer.

3. The roll stabilization system according to claim 2, wherein the control device is integrated in a swivel motor of the electric roll stabilizer.

4. The roll stabilization system according to claim 2, wherein cables leading from the control device to a swivel motor run through a conduit whose outer layer is provided with metal spirals.

5. The roll stabilization system according to claim 1, wherein the DC voltage converter comprises a control unit by which the feed voltage can be determined and which only initiates a transformation of the feed voltage if the feed voltage differs from the supply voltage.

6. The roll stabilization system according to claim 1, wherein the DC voltage converter is designed as either a transforming converter or as a converter with a storage throttle.

7. The roll stabilization system according to claim 1, wherein the supply voltage is between 40 and 48 volts.

8. A control device in combination with a motor vehicle roll stabilization system comprising, an electric roll stabilizer having a DC voltage converter associated therewith such that a feed voltage can be transformed by the DC voltage converter into a supply voltage for the roll stabilizer, the DC voltage converter is integrated in the control device which is integrated in the electric roll stabilizer, and the feed voltage on an input side of the DC voltage converter is transformed, by the DC voltage converter, into the supply voltage on an output side.

9. The control device in combination with the motor vehicle roll stabilization system according to claim 8, wherein the control device is provided with a code.

10. A roll stabilization system for a motor vehicle, the roll stabilization system comprising:
- an electric roll stabilizer being connected, via a lead, to a vehicle electrical system;
- a swivel motor being integrated in the roll stabilizer and comprising electronic components and a control device, and the swivel motor being powered by a supply voltage and the control device regulating the supply voltage transmitted to the swivel motor;
- a DC voltage converter having a control unit, the DC voltage converter being connected to the lead for receiving a feed voltage from the vehicle electrical system, and the control unit of the DC voltage converter determining a value of the feed voltage and initiating transformation of the feed voltage, by the DC voltage converter into the supply voltage, only if the value of the feed voltage is different from a value of the supply voltage; and
- the DC voltage converter being connected, via cables, to the electronic components of the swivel motor to transmit the supply voltage from the DC voltage converter to the electronic components for powering the swivel motor which produces a restoring torque in the roll stabilization system.

\* \* \* \* \*